United States Patent Office 2,733,170
Patented Jan. 31, 1956

2,733,170

COATING COMPOSITION

John B. Welch, Elmwood Park, Ill., assignor to Spring Packing Corporation, a corporation of Illinois No Drawing. Application March 2, 1953,
Serial No. 339,944

10 Claims. (Cl. 117—92)

This invention relates to a coating composition, and more particularly to a coating composition comprising alternating series of relatively thin coatings of a fire-retardant, foam-forming paint and relatively thick coatings of an insulating bituminous composition.

United States Patent No. 2,523,626, issued September 26, 1950, describes a fire-retardant paint which includes a protein, a foam-forming ingredient such as monoammonium phosphate, diammonium phosphate, phosphoric acid, ammonium sulfate, sulfamic acid, ammonium sulfamate, ammonium bromide, sodium tungstate, sodium borate or boric acid, and a binder, particularly a binder of a urea-formaldehyde resin, all suspended in a liquid carrier.

In McGrew, United States Patent No. 2,333,189, there is disclosed a plastic bituminous insulating composition which can be applied to vertical structures in thick layers which will not crawl, slide, or slip. The usual insulating material is cork, but other ingredients are likewise described for that purpose.

My present invention is not related to the composition either of the foam-forming fire-resistant paint, nor to the plastic bituminous insulating material; but rather to the use of the two in such a way as to accomplish results not obtainable with either alone.

I have discovered that if a structure is protected with alternating series of the foam-forming, fire-retardant paint in relatively thin coatings and relatively thick coatings of the plastic bituminous insulating composition, it is possible not only to protect the underlying surface from fire, but to protect it from corrosion, to provide a vapor seal, and to protect it from the heating effects of a fire, particularly of a flash fire.

The bituminous materials described in the McGrew patent are actually fire resistant to the extent that a blowtorch can be applied thereto without producing a self-sustaining fire. The material, however, does not have the fire-resisting and protecting properties of the foam-forming, fire-retardant paint. On the other hand, the fire-retardant paint has no substantial corrosion-resistant properties, nor does it vapor seal.

By means of the present invention, it is possible to protect steel for pre-determined periods of time from reaching a temperature at which it will lose strength—as for example, 1100° F., even in a severe exposure to flame. Likewise, the combination of coatings may be used to protect masonry from spalling in a fire.

In applying the invention, the surface, which may be wood; steel, iron, or other metal; masonry or other stone; or, in fact, any suitable surface to which the coatings will adhere, is suitably prepared in order to clean it and provide suitable adherence. Depending upon the condition and type of structure, this may be by sandblasting or wire-brushing, or even chemical treatment. A suitable primer paint is then applied where necessary.

The fire-retardant, foam-forming paint is then applied in the usual thicknesses. A preferred foam-forming paint is now being marketed under the name of "Albi." The Albi Temp-Kote PC is available for wood surfaces, the Albi Temp-Kote 99 for surfaces generally, and the Albi–"R" is a water-base material. A lacquer-type Albi 99 is likewise available. Normally, the dried thickness of the fire-retardant paint is approximately .0035 to .004 inch per coat. It is generally desired to use sufficient to provide a total thickness of from .007 to .012 inch, this normally being accomplished by the use of two to three coats. After the first coat of fire-retardant paint has been applied, the plastic bituminous material, preferably the cork-containing material described in the aforegoing patent to McGrew, is applied over the fire-retardant. Normally, this is in a thickness of ⅛ to ⅝ inch. The fire-retardant paint is then again applied, if necessary or desirable, followed by another coat of the asphaltic plastic.

It is normally preferred to have the fire-retardant paint as the first coat, but I have made successful applications in which the asphaltic material is either on the inside or on the outside, or both. It is generally undesirable to have the fire-retardant paint as the outside coat because of adverse effect of the sun upon it. The total thickness of asphaltic material will depend on the insulating quality selected and also upon the ultimate amount of insulation, corrosion resistance, and vapor sealing required.

The invention has particular value in the petroleum field, especially for oil storage tanks or in the vicinity of oil storage tanks where severe fires are likely.

Normally, the thickness of the asphaltic material of the cork-base type will be from ⅛ inch to 1½ inches, the bulk and preferred range being from about ⅝ inch to 1¼ inches.

Instead of using successive coatings of the fire-retardant paint and plastic bituminous material, I have found that a mixed coat comprising 15%–30% of the fire-retardant, foam-forming paint and 70%–85% of the plastic bituminous material provides a coating which has the advantages of both coatings without the disadvantages of either. Such coatings may be applied in thicknesses of ⅛ to ⅝ inch, or even more.

While I have referred to the McGrew patent as describing a suitable form of plastic bituminous insulating material, I do not mean to imply that the plastic bituminous composition must be one which is within the description of that patent. Reference to McGrew Patent No. 2,333,189 is merely for the purpose of describing specific compositions which are suitable for the purposes of this invention. Similarly, with respect to Patent No. 2,523,626, I do not mean to imply that the fire-retardant paint suitable for use herein must be one within the confines of that patent. I merely cite it as defining specific compositions suitable for use in the present invention.

The foregoing detailed description has been given for clearness of understanding only and no unnecessary limitations should be understood therefrom as modifications will be obvious to those skilled in the art.

I claim:

1. An article comprising a structure having thereon a composite coating comprising alternating series of relatively thin layers of a fire-retardant, foam-forming paint and relatively thick layers of plastic bituminous insulating material.

2. An article as set forth in claim 1 in which the fire-retardant, foam-forming paint is the first member of the series.

3. An article as set forth in claim 1 in which there are at least two layers of each material.

4. A coated object comprising a structural base having attached to a surface thereof a series of relatively thin coats of a fire-retardant, foam-forming paint alternating with relatively thick coatings of asphaltic plastic insulating material.

5. The method of protecting structural elements against fire, corrosion, and vapor loss which comprises covering a surface thereof with an alternating series of foam-forming, fire-retardant paint and plastic bituminous insulating material in relatively thick layers.

6. An article comprising a structure having thereon a coating composition comprising a thin layer of fire-retardant, foam-forming paint and a relatively thick layer of plastic bituminous insulating material thereon.

7. An article as set forth in claim 6 in which the paint has a thickness of approximately .0035 to .004 inch.

8. An article as set forth in claim 6 in which the bituminous insulating material has a thickness of approximately 1/8 to 5/8 inch.

9. An article comprising a structure having thereon a composite coating comprising a fire-retardant, foam-forming paint and a plastic insulating bituminous material, the composition being fire, corrosion, and vapor-loss resistant.

10. An article comprising a structure having thereon a coating comprising alternating series of relatively thin layers of a fire-retardant foam-forming paint, said paint having including a protein a foam-forming ingredient and a binder, said protein foam-forming ingredient and binder being incorporated in a suitable matrix, and relatively thick layers of plastic bituminous material, said material including cork.

References Cited in the file of this patent

UNITED STATES PATENTS

| | | |
|---|---|---|
| 1,577,890 | Abraham | Mar. 23, 1926 |
| 2,333,189 | McGrew | Nov. 2, 1943 |
| 2,523,626 | Jones | Sept. 26, 1950 |